United States Patent [19]
Steinbruegge

[11] Patent Number: 4,505,550
[45] Date of Patent: Mar. 19, 1985

[54] INFRARED ACOUSTO-OPTIC TUNABLE FILTER

[75] Inventor: Kenneth B. Steinbruegge, Murrysville, Pa.

[73] Assignee: Westinghouse Electric Corp., Pittsburgh, Pa.

[21] Appl. No.: 345,126

[22] Filed: Feb. 2, 1982

[51] Int. Cl.³ .............................................. G02F 1/11
[52] U.S. Cl. ...................................... 350/372; 350/1.1
[58] Field of Search ........................ 350/1.1, 372, 373

[56] References Cited

U.S. PATENT DOCUMENTS 3,632,193  1/1972  Kusters ........................... 350/358 X

OTHER PUBLICATIONS

Dixon, R. W., "Acoustic Diffraction of Light in Anistropic Media", IEEE Journal of Quantum Electronics QE-3, 85 (1967).
Harris, S. E., et al., "Acousto-Optic Tunable Filter", JOSA, vol. 59, No. 6, Jun. 1969, pp. 744–747.
Gottlieb, M. et al., "Acousto-Optic Properties of Some Chalcogenide Crystals", Journal of Applied Physics, vol. 45, No. 12, pp. 5145–5151, Dec. 1974.
Chang, I. C., "Laser Detection Utilizing Tunable Acoustooptic Filters", IEEE J. of Quantum Electronics, vol. 14, No. 2, Feb. 1978.
Gottlieb, J. D., et al., "Recent Developments in Infrared Acousto-Optic Tunable Filters", Westinghouse R and D Center.

Primary Examiner—Bruce Y. Arnold
Attorney, Agent, or Firm—T. R. Trempus

[57] ABSTRACT

An improved infrared acousto-optic tunable filter is provided by an acousto-optic birefringent crystal having polished, uncoated input and output faces normal to the radiation incident-on or diffracted-by the crystal, respectively, and wherein crystallographic axis is oriented at about 21 degrees to the incident infrared radiation, rf transducer means coupled to the crystal for tuning or selecting a narrow bandwidth infrared wavelength of interest, and input and output wire grid polarizer are aligned with the crystal. The input wire grid polarizer is aligned to polarize the input infrared radiation in the same plane as the plane of the b-c crystalline axes of the crystal. The output wire grid polarizer is disposed with the parallel conductors aligned transversely to the conductors of the input polarizer, so that only the selected or tuned bandwidth of interest is transmitted through the output polarizer.

3 Claims, 4 Drawing Figures

INFRARED ACOUSTO-OPTIC TUNABLE FILTER

BACKGROUND OF THE INVENTION

The present invention relates to acousto-optic tunable filters and particularly those which are usable in the infrared portion of the electromagnetic spectrum. The term acousto-optic filter refers to the fact that in certain birefringent optical materials, a light beam propagating as an e-ray, can under certain conditions, be converted into an o-ray by interaction with, and diffraction from, an acoustic wave propagating in the same medium. This phenomenon has been utilized in producing narrow band optical filters the peak transmission wavelength of which can be selected by properly choosing the frequency of the acoustic wave. Such filters have typically operated in the visible spectral region using collinearly propagating acoustic and light beams in selected oxide materials. It is also known that the acoustic wave can be launched in the acoustic medium non-collinearly with the light beam to achieve the same acousto-optic narrow band filtering.

The development of new efficient infrared acousto-optic materials such as thallium-arsenic-selenide ($Tl_3AsSe_3$) as described in U.S. Pat. No. 3,792,287, thallium-phosphorus-selenide per No. 3,929,970, and thallum-arsenic-sulfide per No. 3,799,659 all owned by the assignee of the present invention, provides the possibility of operation over the near-to-mid infrared range of from about 1.3 micrometers to about 16 micrometers. It has been the practice to utilize input and output polarizers with such acousto-optic materials to effectuate the filter capability. The conventional polarizers are either a prism type or pile-of-plates infrared polarizers which are typically available for infrared transmission. These prior art polarizers tend to limit the radiation throughput through the filter because such polarizers are only efficient for nearly normal incident light. These polarizers are also very expensive to fabricate and difficult to align with the rest of the light input and detection system with which the filter finds application.

It is also known that an efficient infrared polarizer can be fabricated by providing an array of parallel-spaced conductors upon a substrate with the spacing between adjacent conductors being less than the wavelength of infrared operation. Such spaced conductor or wire grid polarizers have found application with spectrophotometers in the spectroscopy of crystals and plastics, as elements in beam splitters and analyzers in polarizing interferometers, and in a variety of other infrared optical systems.

SUMMARY OF THE INVENTION

An improved infrared acousto-optic tunable filter is provided by an acousto-optic birefringent crystal and rf transducer means coupled to the crystal with wire grid polarizers utilized as the input and output polarizers optically coupled and aligned with the acousto-optic crystal. The input wire grid polarizer is disposed with the spaced-apart aligned conductors parallel to the plane formed by the b-c crystalline axes of the acousto-optic crystal, $Tl_3AsSe_3$ for example, to efficiently polarize the input infrared radiation in a plane parallel to the b-c crystal plane. The output wire grid polarizer is disposed with the parallel conductors aligned transversely to the conductors of the input polarizer. The selectively polarized input infrared radiation is polarization-shifted at the selected bandwidth portion of the input infrared radiation by 90 degrees so that it is distinguishable from the unshifted input infrared radiation. The output wire grid polarizer passes the 90-degree shifted polarized selected bandwidth portion of the infrared radiation transmitted through the acousto-optic member for analysis.

DESCRIPTION OF THE PREFERRED EMBODIMENTS

Figure 1:
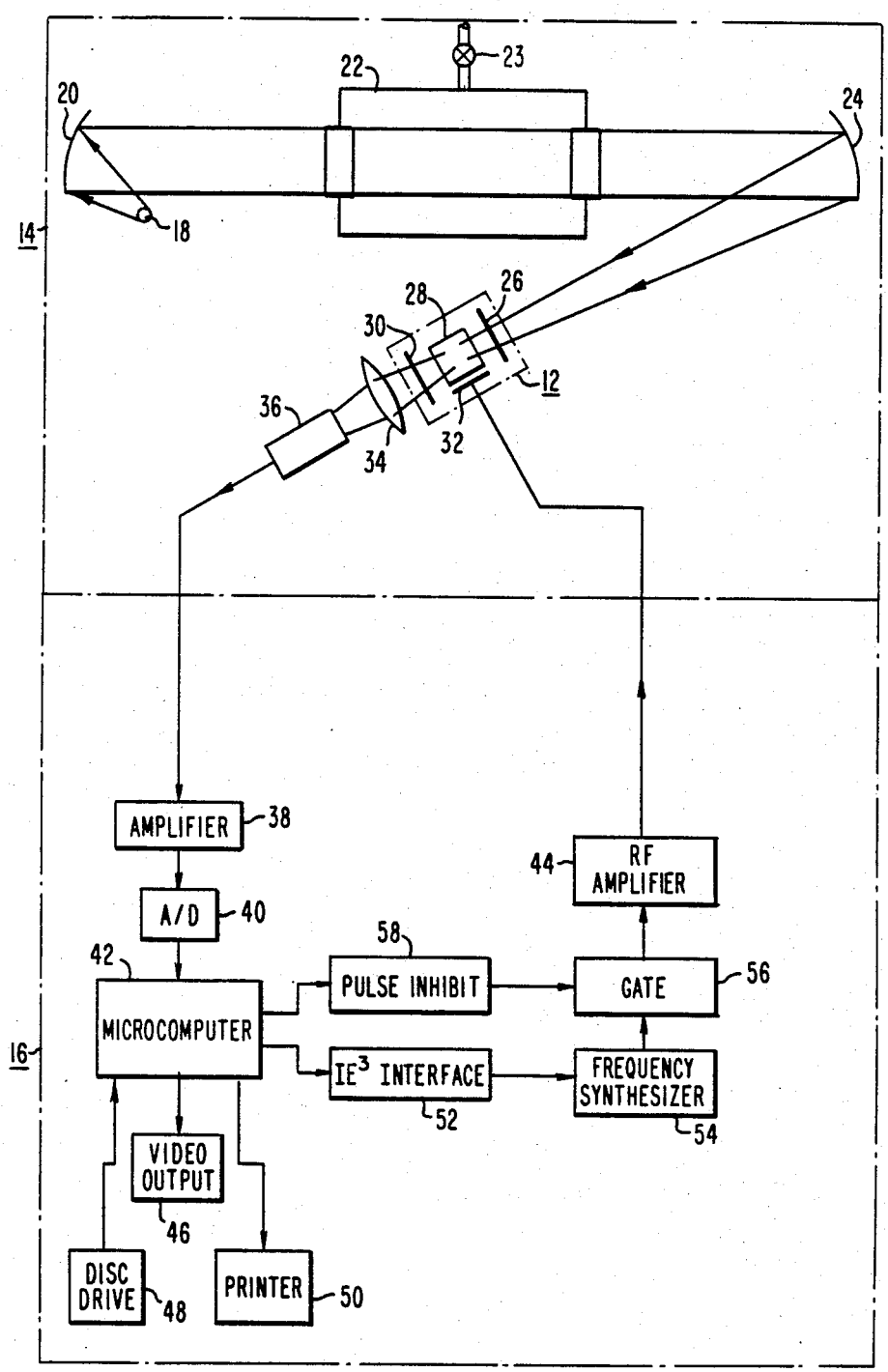
FIG. 1 is a schematic diagram of an automated infrared analyzer system utilizing the acousto-optic tunable filter of the present invention.

An automated acousto-optic tunable filter infrared analyzer system 10 is seen in FIG. 1 configured from a variety of subsystems and components including the acousto-optic tunable filter 12. The total system 10 can be viewed as having two major subsystems, an optical system 14 and an electronic system 16. The optical system 14 of the analyzer system 10 is essentially an infrared solid-state spectrometer which has been designed to permit operation over a relatively wide spectral range. An infrared radiation source 18 such as a Nernst glower is used as the primary source of broad band infrared radiation for this system. A portion of the output radiation from the source 18 is collected and collimated by mirror 20. The collimated beam from mirror 20 then passes through a sample cell 22 which contains the material which is to be analyzed. Such materials can be gases such as methane, carbon dioxide, and carbon monoxide which exhibit narrow band absorption in the infrared. A second mirror 24 is aligned with the first mirror 20 to collect the collimated beam after it passes through the sample cell 22 with the second mirror 24 directing the beam to the acousto-optic tunable filter 12.

The acousto-optic tunable filter 12 comprises an input polarizer 26, an acousto-optic crystal 28, and an output polarizer 30. The acousto-optic tunable filter 12 is seen enlarged in a top view in FIG. 2. The acousto-optic crystal 28 is a 1.4 centimeter long × 1 centimeter cross section thallium-arsenic-selenide crystal which has polished uncoated ends. The input optical face of the crystal 28 is cut so as to be normal to the incident infrared beam, while the output beam is diffracted at an angle of about 6 degrees to the incident beam and the exit optical face is cut so as to be normal to the diffracted beam. An acoustic transducer 32 is mated to one of the opposed side surfaces of the crystal 28 and consists of an X-cut lithium niobate crystal plate which is attached to the acousto-optic crystal with an indium metal bond. A conductive electrode pattern is provided on both sides of the lithium niobate transducer. The electrode is driven from the electronics system 16 as will be described hereafter.

Figure 2:
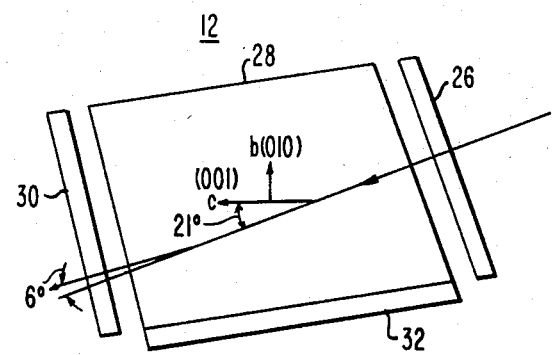
FIG. 2 is an enlarged representation of the acousto-optic tunable filter of the present invention.
Figure 3A:
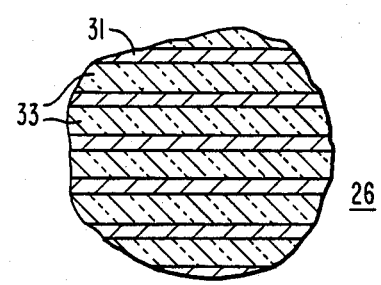
FIG. 3A is a greatly enlarged representation of the input polarizer seen in FIG. 2 illustrating the orientation of the conductors.
Figure 3B:
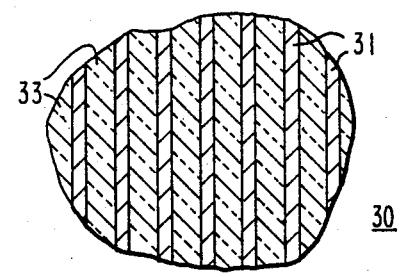
FIG. 3B is an enlarged representation of the output polarizer seen in FIG. 2 illustrating the orientation of the conductors relative to the input polarizer conductors.

The input polarizer 26 and output polarizer 30 both comprise what are termed wire grid polarizers in which a planar plurality of parallel closely spaced conductors 31 are typically provided upon a radiation transmissive substrate 33, with the spacing between adjacent conductors being less than the wavelength of transmitted radiation. Such wire grid or spaced conductor infrared polarizers are available under product designation IGP228 from Cambridge Physical Sciences. In this specific wire grid polarizer the device is operable over the spectral range of about 1 to 12 micrometers. The spaced parallel conductors are disposed on a barium fluoride substrate which is about 2 millimeters thick. The grid spacings between conductors is about 0.5 micrometers and the degree of polarization achieved is between about 93% and 98%, with a transmission efficiency of about 85%. The acousto-optic crystal 28 as seen in FIG. 2 which shows the crystal base which contains the crystalline b-c axes, and the optical beam is propagated at about 21° to the crystallographic c or optic axis. This angular relationship between the input radiation beam and the crystalline c or optic axis is not critical and can be varied, but will affect the specific rf frequency which is used to select or tune the desired narrow bandwidth wavelength of interest. The parallel closely spaced conductors 31 of the input polarizer 26 are aligned with the plane formed by these b-c crystalline axes of the acousto-optic crystal to efficiently polarize the input infrared radiation in a plane parallel to the b-c crystal plane. As best seen in FIGS. 3A and 3B, the relative orientation of the input polarizer conductors is shown as being horizontal, while the orientation of the conductors 31 for the output polarizer is aligned transversely to the conductors of the input polarizer. In this way, the output polarizer transmits only the 90-degree shifted polarized selected narrow bandwidth portion of the infrared radiation transmitted through the acousto-optic member and filters out the remaining infrared radiation. A focusing lens 34 focuses the filtered narrow bandwidth infrared radiation of interest upon an infrared detector 36 which is operable over a very wide spectral range.

In FIG. 2, the acousto-optic crystal is schematically shown with the b (010) and c (001) crystalline axes indicated, and the input polarized infrared radiation is directed at an angle of about 21 degrees relative to the c or optic axis of the crystal. The particular rf tuning frequency which is needed to select and distinguish a desired narrow bandwidth of interest for analysis can be had from the relationship:

$$\lambda_o = \frac{v_a \Delta n}{f} (\sin^4\theta_i + \sin^2 2\theta_i)^{\frac{1}{2}},$$

where $\lambda_o$ is the peak optical wavelength passed by the filter, $v_a$ is the acoustic velocity, $\Delta n$ the birefrigence, f the rf frequency, and $\theta_i$ the angle which the incident light beam makes with the c or optic axis of the crystal. In setting up or aligning the system a low power infrared laser of known wavelength is directed along the optical path and rf energy of the normal frequency associated with this wavelength is applied to the transducer and crystal. The crystal is oriented to align the angle of incidence to the optic axis that gives optimum performance.

The analog output signal from detector 36 is fed to amplifier 38 and to analog-to-digital converter 40 with the resultant digital signal applied to microcomputer 42.

The electrical subsystem 16 interfaces with the optical subsystem at the acousto-tunable filter 12 via the transducer 32 which is connected to the rf amplifier 44 from which selected frequency rf drive power is applied via the transducer 32 to launch acoustic waves in the crystal 28. In this way optically filtered infrared signals detected can be processed by the microcomputer to determine the absorption resulting from the presence of selected gases in the sample cell. The microcomputer 42 typically has a video output means 46 associated therewith for real time user viewing of the sample information, and a printer 50 for compiling the information. A disc memory means 48 stores the control program which operates the microcomputer for controlling the sequence, timing and selection of sampling frequency. The microcomputer 42 through an appropriate interface means 52 controls the output frequency and amplitude from a frequency synthesizer 54 which is connected via gate means 56 to the rf amplifier 44 for pulse operation. The gate 56 is utilized in conjunction with a pulse inhibit circuitry 58 to provide assurance that the rf pulses of the proper width are applied to the transducer while the rf power duty cycle is limited to a low level. In general, the filter is operated at an rf input frequency of about 10-100 MHz. This system is capable of operating not only as a rapidly tunable narrow band infrared filter but also as a solid-state optical chopper as well.

A more detailed description and method of operation of the described system can be had from the article "Automated Acousto-Optic Tunable Filter (AOTF) Infrared Analyzer", from the Proceedings of the SPIE—The International Society for Optical Engineering, Vol. 268, 1981, pp. 160-166.

The infrared analyzer in which the improved filter of the present invention is used takes advantage of several spectral characteristics of materials which are found or introduced into the sample cell. Specific molecular species have distinctive characteristic absorption spectrum which is unique for the specific molecule. The spectra of mixtures of species are additive, and the characteristic absorption is proportional to concentration. The characteristic absorption spectrum can be obtained by non-destructively transmitting input light or radiation through the sample, be it solid, liquid or gas.

The ready tunability of the acousto-optic filter of the present invention makes it readily useable in an on-line multifunction analyzer in a wide variety of industrial processes. These processes range from chemical reaction process control, to stack gas anaylzers, to combustion product analyzers for controlling the efficient burning of fuels. A variety of combustion products such as $CO_2$, $CO$, $SO_2$ can be readily quantitatively and qualitatively identified and measured.

While the tunable filter of the present invention has been described with respect to a specific acousto-optic material thallium-arsenic-selenide, which is a uniaxial material, other infrared transmissive acousto-optic materials can be utilized. A biaxial material such as thallium-phosphorus-selenide can be substituted as the acousto-optic crystal with the proper orientation provided between the polarizers and the crystal axes to produce the desired selection or filtering of the wavelength of interest as a function of acoustic frequency.

I claim:

1. An improved infrared acousto-optic tunable filter for use with collimated infrared radiation comprising in combination: an input polarizer; an output polarizer; an acousto-optic member optically aligned with said input polarizer and said output polarizer, which acousto-optic member comprises an acousto-optic birefrigent thallium-arsenic-selenide ($Tl_3AsSe_3$) crystal having polished, uncoated input and output faces, which input face is normal to the incident infrared radiation and which output face is normal to the infrared radiation diffracted by said acousto-optic tunable filter, and an rf transducer means coupled to a side face of the crystal member other than the input or output face of the crystal for launching acoustic waves in the crystal which are non-collinear with, and which interact with a selected bandwidth portion of polarized input infrared radiation which is propagated at about 21° to the crystallographic axis, in order to shift the polarization of the selected bandwidth portion of the input infrared radiation by 90 degress so that it is distinguishable from the unshifted input infrared radiation, which selected bandwidth portion is a function of the rf energy input frequency, said selected bandwidth portion being over the range of about 1.3-16 micrometers; wherein the input polarizer comprises a wire grid polarizer having a planar, plurality of parallel closely spaced conductors with the spacing between adjacent conductors being less than the wavelength of the input infrared radiation, the wire conductor spacing being at least about 1000 wires per millimeter with a grid spacing of about 0.5 micrometers;

and wherein the parallel closely spaced conductors are aligned with the plane formed by the b-c crystalline axes of the acousto-optic crystal to efficiently polarize the input infrared radiation in a plane parallel to the b-c crystal plane, and wherein the output polarizer comprises a wire grid polarizer having a planar, plurality of parallel closely spaced conductors spaced to pass infrared radiation transmitted through the acousto-optic member, the wire conductor spacing being at least about 1000 wires per millimeter with a grid spacing of about 0.5 micrometers with the parallel conductors of the output polarizer aligned transversely to the conductors of the input polarizer, whereby only the 90 degree shifted polarized selected bandwidth portion of the infrared radiation tramsitted through the acousto-optic member passes through the output polarizer.

2. The improved filter set forth in claim 1, and further including a sample cell containing a material wherein the input infrared radiation has been transmitted through said sample cell which selectively absorbs infrared radiation as a function of the material in the sample cell, and the input rf energy to the input transducer is selected to tune the filter to transmit this selectively absorbed infrared radiation to permit identification of the material in the sample cell.

3. The improved filter set forth in claim 1, wherein an infrared radiation detector means is optically coupled to the output wire grid polarizer to permit detection of the transmitted selected bandwidth portion of infrared radiation.

* * * * *